United States Patent [19]
Talmadge

[11] Patent Number: 4,862,375
[45] Date of Patent: Aug. 29, 1989

[54] MAGNETIC POWER COUPLER FOR A VAULT CARTRIDGE

[75] Inventor: Paul C. Talmadge, Ansonia, Conn.

[73] Assignee: Pitney Bowes Inc., Stamford, Conn.

[21] Appl. No.: 104,126

[22] Filed: Oct. 5, 1987

[51] Int. Cl.[4] .............................................. G07F 7/10
[52] U.S. Cl. ............................... 364/464.02; 235/492;
364/466; 340/870.31
[58] Field of Search .................... 340/870.31; 235/487,
235/492; 364/464.02, 466

[56] References Cited

U.S. PATENT DOCUMENTS

| | | | |
|---|---|---|---|
| 3,534,310 | 10/1970 | Pellissier | 336/83 |
| 3,743,989 | 7/1973 | Nicolas et al. | 336/5 |
| 3,848,229 | 11/1974 | Perron et al. | 235/382 |
| 4,038,625 | 7/1977 | Tompkin et al. | 336/83 |
| 4,087,774 | 5/1978 | Beuchat | 336/73 |
| 4,130,242 | 12/1978 | Mannion | 235/450 |
| 4,305,056 | 12/1981 | Mochida et al. | 336/219 |
| 4,605,844 | 8/1986 | Haggan | 235/380 |

FOREIGN PATENT DOCUMENTS 0198642 10/1986 European Pat. Off. .

*Primary Examiner*—A. D. Pellinen
*Assistant Examiner*—Jeffrey A. Gaffin
*Attorney, Agent, or Firm*—Donald P. Walker; Melvin J. Scolnick; David E. Pitchenik

[57] ABSTRACT

A vault cartridge having a data storage means for the storage of data therein. The cartridge has a size and a shape which is adapted for insertion within a vault receptacle coupled to a host system. The vault receptacle has a primary portion of a magnetic power coupling means made of a primary core and a primary winding operatively coupled to the core. The vault cartridge further comprises a secondary portion of the core having a secondary winding operatively coupled thereto. The portions of the core within both the cartridge and the receptacle are disposed such that when the cartridge is inserted within the receptacle the two portions of the core are magnetically coupled one to the other. A source of excitation energy applied to the primary winding is magnetically coupled through the core and into the secondary winding of the cartridge. Power conversion means is provided within the cartridge for deriving operating power from the secondary winding. The primary winding may also have a current sensing means coupled thereto whereby the host system is enabled to determine the coupling state of the cartridge.

17 Claims, 3 Drawing Sheets

MAGNETIC POWER COUPLER FOR A VAULT CARTRIDGE

FIELD OF THE INVENTION

The present invention relates generally to a data storage module, or vault cartridge, and, in particular, relates to a magnetic power coupling apparatus and method for coupling operating power into the cartridge.

BACKGROUND OF THE INVENTION

It has been known to provide portable data storage modules such as credit cards. In general, these modules contain data storage means, such as random access memory, and memory supporting circuits. These modules may also contain a central processing unit (CPU) which is operable for storing data within the memory and for performing other functions, such as accounting related functions. Many of these data storage modules also contain a battery to provide operating power for the circuits contained therein. It has also been known to provide regulated DC power through electrical contacts exposed upon a surface of the module.

As can be appreciated, there are a number of disadvantages inherent in the use of such power coupling techniques. For example, if a battery is to power all of the circuits within the module for an extended period of time the storage capacity and, hence, the physical size of the battery may need to be excessively large.

For those modules that have terminals for the coupling of regulated DC power a plurality of such terminals may be required if the module requires for operation several different DC voltages. Furthermore, inasmuch as the power terminals may be directly coupled to integrated circuits within the module the terminals may conduct static electric discharges into the module and directly into the circuits. Such static electric discharges may degrade or cause the complete failure of the circuits. Also, during coupling of the module to the power terminals the circuit ground or common connection may be made after the DC power connection, resulting in possible damage to the circuits.

It is therefore one objective of the present invention to provide a magnetic power coupling means for coupling operating power into the cartridge.

It is a further objective of the present invention to provide for the coupling of operating power into the cartridge by means of two conductors from which a plurality of operating voltage levels may be derived.

It is a still further objective of the present invention to provide for the coupling of operating power into the cartridge that avoids the possibility of damage to cartridge circuits resulting from static electrical discharge on improper power sequencing.

It is one further objective of the present invention to provide a means for indicating the coupling state of a vault cartridge relative to a vault receptacle.

SUMMARY OF THE INVENTION

The foregoing objectives are realized and the foregoing problems of the prior art are overcome by a magnetic power coupling system comprising means for magnetically coupling electrical power from a cartridge receptacle to a cartridge comprising a substantially planar primary core having a primary winding disposed thereabout and a source of excitation energy operatively coupled to the primary winding, the primary core being disposed within the receptacle; and a substantially planar secondary core having a secondary winding disposed thereabout and a power conditioning means coupled to the secondary winding for deriving a desired voltage or desired voltages therefrom, the secondary core being disposed within the cartridge; and wherein the cartridge has an area of the secondary core exposed on an outer surface thereof, the exposed area being disposed such that when the cartridge is coupled to the receptacle the exposed area is magnetically coupled to a corresponding exposed area of the primary core for completing a magnetic flux path between the primary and the secondary cores.

BRIEF DESCRIPTION OF THE DRAWINGS

The foregoing aspects and other features of the invention will become apparent in the following detailed description of the invention taken in conjunction with the accompanying drawings wherein.

DETAILED DESCRIPTION OF THE INVENTION

Figure 1:
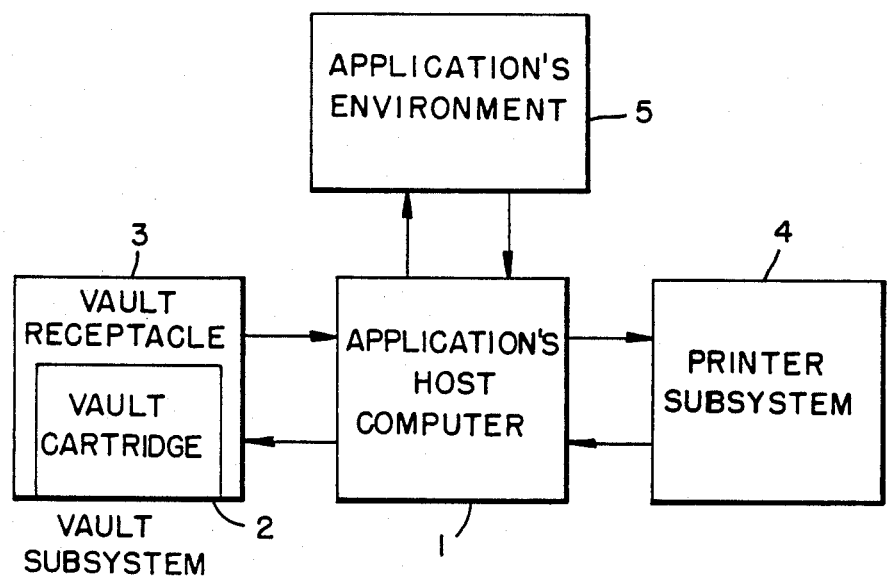
FIG. 1 is a block diagram showing a vault cartridge coupled to an application host computer through a vault receptacle.

Referring now to FIG. 1 there is shown in block diagram form a system having an application's host computer 1 bidirectionally coupled to a vault subsystem which comprises a vault cartridge 2 coupled to a vault receptacle 3. Application's host computer 1 is also bidirectionally coupled to a printer subsystem 4 and is further bidirectionally coupled to an application's environment 5. In general, host computer 1 may be any data processing means operable for executing an application program, such as a computer operable for executing a postage dispensing application program. The application's environment 5 may be a user of the host computer or may also be another computing system which is coupled to the application's host computer and is operable for transmitting data to and receiving data from the application's host computer The block designated as 5 may comprise a familiar CRT screen and a keyboard which are both operable for providing an operator with a means for interacting with the application's host computer 1. Vault cartridge 2 may comprise a data storage means operable for storing data generated by the application's host computer 1. The vault cartridge 2 may also comprise, for example, ascending and descending postage registers which are maintained within the cartridge 2 in a secure environment. The vault receptacle 3 may be an electromechanical mechanism having electronic and electrical power coupling means for coupling data into and out of the vault cartridge 2 and also for providing operating power thereto. In accordance with the invention, the vault cartridge 2 may be detachably coupled to the vault receptacle enabling the cartridge to be removed and inserted as desired by a user or some operator of the system. Printer subsystem 4 may be any suitable printing means which is operable for receiving data from the application's host computer for printing. The printer subsystem 4 may be a printer operable for printing postage indicia which are representative of a monetary value of postage. Printer subsystem 4 may be a secure printer system which is bidirectionally coupled to the application host computer 1 for receiving therefrom and transmitting thereto security codes such as cryptographic codes which enable the printer subsystem 4 to print. Although shown as a plurality of separate blocks, it should be realized that the application's host computer the vault cartridge 2, the vault receptacle 3 and the printer subsystem 4 may all be contained within a single system. That is, these blocks may not be independent systems but the functions thereof may all be incorporated within one system. Similarly, different combinations of the blocks are possible such that the application's host computer 1 and the vault receptacle 3 may comprise one system having a printer subsystem coupled thereto through a suitable cable or some other data transmission means.

As an example of the operation of such a system, the application's host computer may receive a request from the application's environment 5, such as a request from a user to print a postage indicia representative of a monetary value of postage. In response thereto, the application's host computer 1 may interrogate the vault cartridge 2 within vault receptacle 3 to determine if the descending register securely contained therein indicates a sufficient value of postage funds to print the desired value of postage. Upon receiving an indication from the vault cartridge 2 that such funds are available the application's host computer may thereafter send data to the printer subsystem 4 which causes the printer subsystem 4 to print the postage indicia indicating the desired monetary value. Of course, such a system as depicted in FIG. 1 may be adapted to a wide number of applications such as the printing of lottery tickets or the printing of tax stamps, such as the stamps affixed to liquor and cigarettes.

Figure 2:
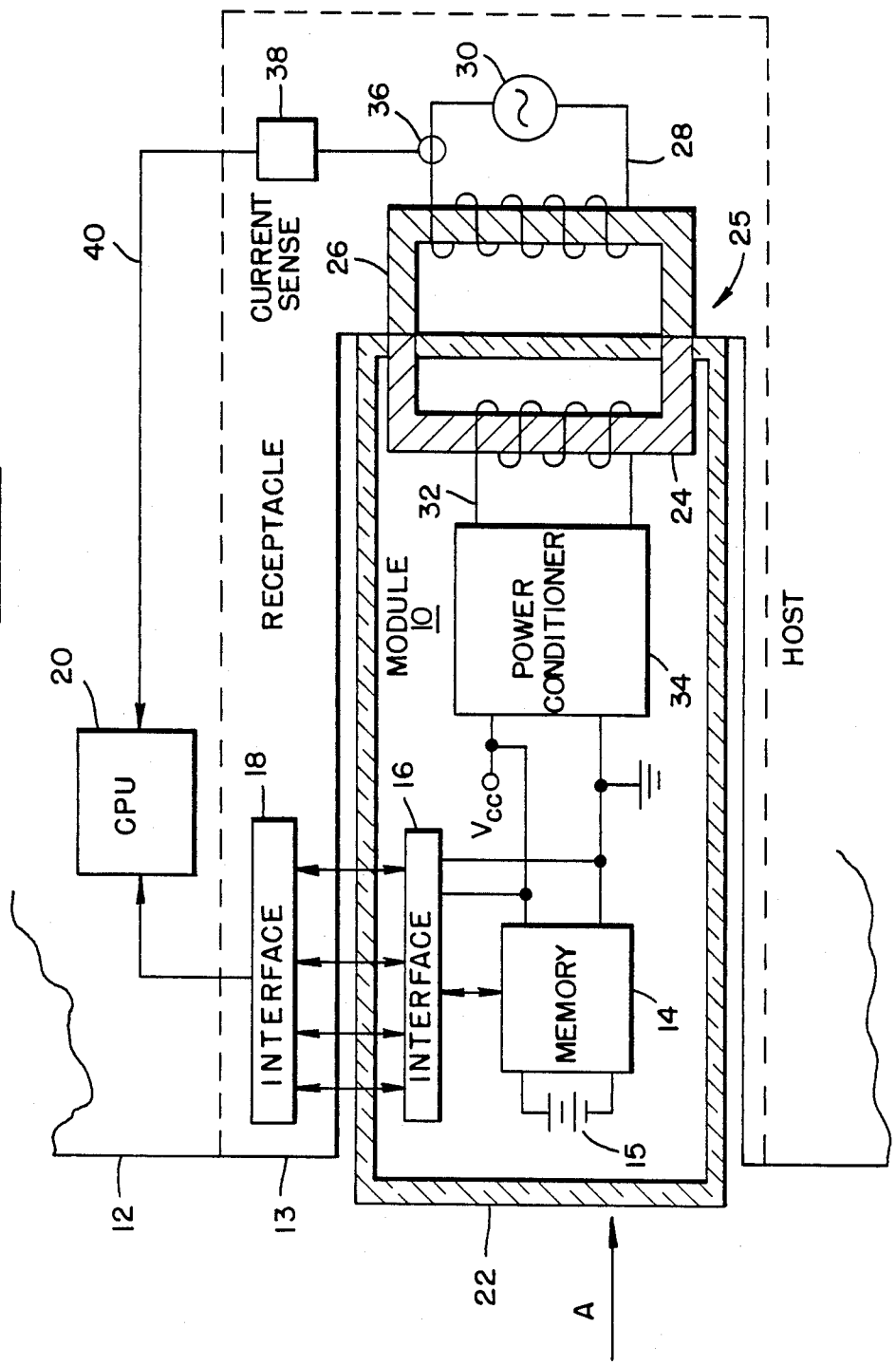
FIG. 2 is a cutaway view, in block diagram form, of a vault cartridge coupled to a host system.

Referring now to FIG. 2 there is shown in block diagram form a vault cartridge 10 coupled to a host device 12 by a vault receptacle 13. It should be understood that cartridge 10 may be coupled to host 12 via the vault receptacle 3 of FIG. 1. The vault receptacle 13 may be a separate device or may be an integral portion of the host 12. Cartridge 10 is comprised of a data storage means such as a random access memory (RAM) 14 which is operable for the read/write storage of data within. RAM 14 may be nonvolatile data storage device, that is, RAM 14 may have a battery 15 coupled thereto for maintaining the data stored within the RAM 14 when the cartridge 10 is uncoupled from the host 12. Cartridge 10 may also comprise a memory interface 16, which may further include a central processing unit, or CPU, (not shown) which is operable for providing the required address, data and control lines to the RAM 14 for storing and retrieving data therefrom. Interface 16 may also comprise data transmission and reception circuitry which is operable for communicating with an interface 18 within host 12. Host 12 may also comprise a CPU 20 coupled to interface 18 for storing and retrieving data within memory 14.

Cartridge 10 may be enclosed within a protective outer cover having walls 22 comprised of an electrically insulating material, such as a thermoplastic type of material.

In accordance with the invention, cartridge 10 also comprises a secondary portion 24 of a magnetic power coupling means, such as a power transformer 25. A primary portion 2 of the transformer 25 is provided within the vault receptacle 13. Primary and secondary portions 26 and 24, respectively, are comprised of a suitable magnetic core material, such as is typically found in power transformers. That is, the core material may be a laminated type of metallic or ceramometalic core material or may be a solid type of core material. Primary portion 26 has a primary winding 28 disposed thereabout, the primary winding 28 being coupled to a source 30 of excitation energy. Secondary portion 24 has a secondary winding 32 disposed thereabout, the secondary winding 32 being coupled to a power conditioner 34 such as a well known full wave or half wave rectifier circuit. Power conditioner 34 may also have voltage filtering and regulation circuitry suitable for deriving DC voltages which are utilized by the circuits within the cartridge 10 for operating power. For example, as shown in FIG. 2 power conditioner 34 has an output voltage Vcc and a ground reference. It should be realized, however, that power conditioner 34 may have a plurality of DC output voltages such as, for example, plus 5 volts, plus 12 volts, minus 12 volts and minus 5 volts. Circuits operable for deriving such DC voltages from the secondary of a power transformer are well known in the art and will not be further described herein.

There may also be coupled to primary winding 28 a current sense means 36 and a current sense circuit 38 having an output 40 for indicating to CPU 20 when primary current is flowing within the primary 28. This primary current in general flows when the cartridge 10 is inserted within the receptacle 13. Thus, the output 40 is expressive of the coupling state of cartridge 10, that is, the output 40 is indicative of whether the cartridge 10 is installed or is not installed within the receptacle 13.

In accordance with the invention, the power transformer 25 is provided as two distinct portions, those portions being the primary 26 and secondary 24. In order to provide for coupling the magnetic flux induced by primary winding 28 through the core when the module 10 is inserted within the receptacle 13, the cartridge 10 being inserted in the direction of the arrow A, the secondary portion 24 may be disposed such that it extends at end portions thereof through the wall 22 of cartridge 10. Thus, when the cartridge 10 is inserted within the receptacle 13, the exposed surface of each end of the secondary portion 24 is in physical contact with similarly exposed portions of the primary portion 26. Such intimate contact allows for magnetic coupling from the primary winding 28 to the secondary winding 32 through the intervening core material with a minimal amount of coupling loss. Of course, the secondary 24 may be also covered by the wall 22 if the wall thickness and the amount of power of primary excitation 30 are such that sufficient magnetic coupling is provided through the intervening gap defined by the wall 22 material.

Figure 3:
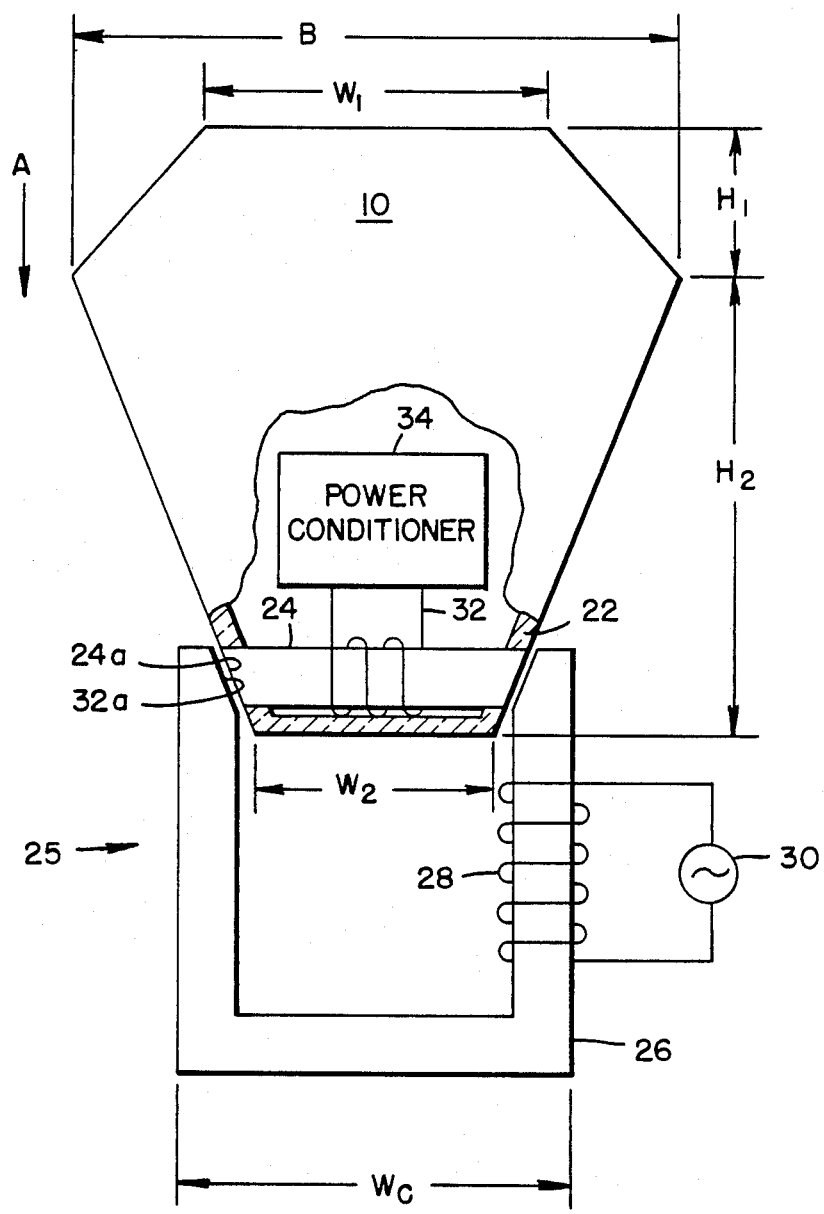
FIG. 3 is a top view, partially in block diagram form, of a data storage module and a host system showing the primary secondary portions of the magnetic power coupling means.

Referring now to FIG. 3 there is shown a preferred embodiment of the secondary portion 24 and the primary portion 26 of the magnetic power coupler. As can be seen, the overall transformer 25 may have a generally square or rectangular shape, the shape being defined by the shape of the core material. The primary portion 26 of the core material may have a generally "U" shape and the secondary portion 24 of the core may have a linear shape predetermined to fit within the upper open arms of the primary. The secondary and primary portions 24 and 26, respectively, may have beveled mating edges 24a and 32a, respectively. The beveled edges are disposed such that when the cartridge 10 is inserted within the receptacle 13 in the direction indicated by the arrow A the edges are brought into physical contact one with the other. It can further be seen in FIG. 3 that the outer wall 22 of cartridge 10 may have a shape which conforms to the angle of the bevel of the edges of the core. The core material of the secondary portion 24 is disposed within the cartridge 10 such that the outer surface of each end of the core material is exposed upon an outer surface of the wall 22. When cartridge 10 is fully inserted within the receptacle 13 and, also, within primary portion 26, magnetic flux continuity is established through the core material resulting in the maximization of the magnetic coupling from the primary winding 28 to the secondary winding 32. The opposing faces of the primary and secondary portions of the core material may have any suitable angle of bevel, or may not be beveled at all. It can be appreciated, however, that the greater the angle of bevel the greater will be the surface area which is in contact, thereby minimizing any coupling losses which may be due to misregistration and misalignment between the cartridge 10 and the receptacle 13. In a preferred embodiment of the invention the core material may have a thickness of approximately 0.125 inch and a width ($W_c$) of approximately 3.15 inches. The length of secondary 24 is approximately 2.5 inches. The ratio of turns between primary winding 28 and second winding 32 is determined by a number of factors, such as the characteristics of the core material, the desired output voltage and other well known parameters.

It should be realized that any shape may be employed for the primary and secondary portions of the power transformer 25, such as a toroidal shape, so long as the chosen shape is amenable to being partitioned into a primary portion and into a secondary portion which fits within the primary portion and magnetically engages therewith to complete the magnetic flux circuit path.

Furthermore, it can be seen in FIG. 3 that cartridge 10 may have a planar asymmetrical shape defined by two trapezoids each having a common, equal base (B) and unequal heights (H) measured from the base. Such a shape results in inwardly tapered side surfaces which provide the aforedescribed bevel to primary and secondary core portions 26 and 24, respectively. For example, the taper angle as measured from the common base may be approximately 15°. Primary 26 may be disposed within receptacle 13 such that when cartridge 10 is fully inserted the front portion of cartridge 10 butts up against primary 26, thereby causing secondary 24 to be aligned with primary 26. As can be appreciated, the inwardly sloping side edges of cartridge 10, in conjunction with the corresponding tapered shape of primary 26, facilitates the alignment of cartridge 10 during insertion.

Representative approximate dimensions of the cartridge 10, expressed in inches, are as follows:

B=3.5
$H_1$=1.0
$H_2$=3.5
$W_1$=2.0
$W_2$=2.75

Figure 4:
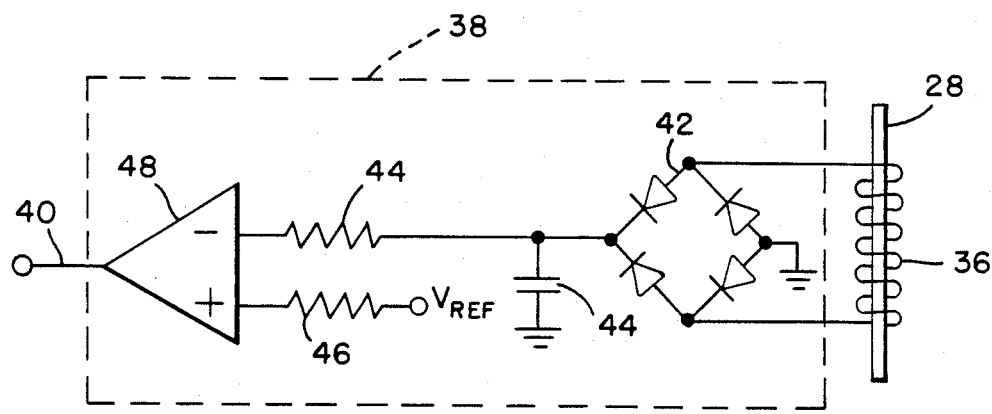
FIG. 4 is a simplified schematic diagram of a primary winding current sense means.

As has been previously stated, there may be a current sensing device 36 and a current sense circuit 38 coupled to primary winding 28. As can be seen in FIG. 4, current sense device 36 may be a conductor which is wound about a portion of the primary winding 28. Coupled to the current sense device 36 may be a full wave diode bridge 42 for rectifying the current coupled into the current sense device 36 from the primary winding 28. A capacitor 44 charges to a voltage potential which is indicative of the magnitude of the current flowing through the primary wiidng 28. First and second resistors 44 and 46, respectively, are coupled to an operational amplifier 48 which is configured in a voltage comparator configuration. A voltage reference $V_{REF}$ is provided at one end of resistor 46, the magnitude of $V_{REF}$ being predetermined such that when the cartridge 10 is inserted within the receptacle 13 the induced voltage due to the current flowing through primary winding 28 exceeds, at capacitor 44, the magnitude of $V_{REF}$. This causes the output 40 of comparator 48 to change state. Output 40 may be coupled to CPU 20, such as by coupling the output 40 to an interrupt input (not shown) of CPU 20. Thus, when the cartridge 10 is inserted or withdrawn from the receptacle 13 the change in primary current flow is sensed and the CPU 20 is thereby apprised of whether the cartridge 10 is inserted or withdrawn. As can be realized, if the cartridge 10 is not installed or coupled to the receptacle 13 the power transformer is in an essentially "open circuit" condition and negligible primary current will flow. When the cartridge 10 is coupled to the receptacle the secondary of the transformer and the load coupled thereto will result in the flow of primary current, the flow of which is detected by the current sense device 36 and associated circuitry.

Power source 30 may be a 400 Hz power source or may have any frequency suitable-for being coupled through the core material from the primary 28 to the secondary 32. As is well known, the higher the frequency of the source 30 the smaller need be the associated magnetic and capacitive components of the power supply. Such a reduction in size of the power supply components may be a desirable feature in a portable data storage module such as the vault cartridge 10. In general, it is desirable to maximize the frequency of power source 30 while yet providing for reliable power coupling. Of course, any frequency may be utilized so long as the primary 26 and the secondary 24 portion of the power coupling means are designed to accommodate the chosen frequency.

It can be appreciated that a number of benefits accrue from the use of the invention. One benefit is that the magnetic power coupling means of the invention permits the coupling of power into an essentially sealed module without the use of card edge type of connectors which are susceptible to wear and degradation after a number of insertions and withdrawals. The use of the invention also eliminates the possibility of malfunctioning or damage to the circuits within the cartridge 10 due to the disruption of DC power and ground connections, such as when the ground connection is disconnected before the DC power connection is disconnected. Another advantage is that if a plurality of DC voltages are required within the cartridge 10 that individual power connectors need not be provided for each of the required voltages. The use of the invention provides for one pair of contacts upon the surface of the cartridge 10 from which a large number of different DC voltages may be derived by the power conditioner 34. A still further advantage that accrues from the use of the invention is that by means of the aforedescribed current sense circuitry coupled to the primary winding 28, the host system may be apprised at any time of whether the cartridge is installed or withdrawn from the receptacle 13.

The use of the invention is advantageous in a number of different types of systems. One such system is a value printing system having a printing means operable for printing indicia representative of a monetary value, such as a system operable for the printing of postage, or a system for printing tax stamps or tickets for entertainment events.

In a postage printing system, for example, it is a requirement that the value of postage printed or otherwise dispensed be accurately accounted for. This postage accounting data is typically maintained in ascending and descending registers, the registers typically being stored within a nonvolatile data storage device. In order to recharge the postage meter with funds, the descending register is typically charged with the desired amount of postal funds. This recharging is typically accomplished at a postal facility by physically removing the entire postage meter to the facility.

As can be appreciated, the use of the invention permits a data storage cartridge, such as the vault cartridge 10, to be removed from the host system 12, which host system may be a postage indicia printing device. The cartridge 10 may then be conveyed to a recharging facility, perhaps by mailing the module, where the module is recharged with postal funds. The recharged module may thereafter be reinserted into the host to resume the printing of postage. So long as the host and the recharging facility each have a corresponding primary portion of the magnetic power coupler, the cartridge 10 may be reliably operated within either. Furthermore, inasmuch as the only terminals which are exposed during the time that the cartridge 10 is withdrawn from the host are the end portions of transformer secondary 24, the likelihood of damage to the integrated circuits within the cartridge 10 from static electrical discharge is reduced.

It should be realized that illustrative embodiments only of the present invention have been provided above and that a number of modifications to the illustrative embodiments may become apparent to those skilled in the art. Therefore, the embodiments disclosed herein are not meant to limit the invention, instead the invention is meant to be limited only as defined by the appended claims.

What is claimed is:

1. A magnetic power coupling system comprising:
   means for magnetically coupling electrical power from a cartridge receptacle to a cartridge comprising a substantially planar primary core having a primary winding disposed thereabout and a source of excitation energy operatively coupled to said primary winding, said primary core being disposed within said receptacle; and
   a substantially planar secondary core having a secondary winding disposed thereabout and a power conditioning means coupled to said secondary winding for deriving a desired voltage therefrom, said secondary core being disposed within said cartridge; and wherein
   said cartridge has an area of said secondary core exposed on an outer surface thereof, said exposed area being disposed such that when said cartridge is coupled to said receptacle said exposed area is magnetically coupled to a corresponding exposed area of said primary core for completing a magnetic flux path between said primary and said secondary cores.

2. A system as defined in claim 1 wherein said excitation energy has a frequency associated therewith of approximately 400 Hz.

3. A system as defined in claim 2 wherein said primary portion further comprises primary current sense means operatively coupled to said primary winding for sensing a magnitude of current therein, said current sense means having an output expressive of the current in said primary winding.

4. A system as defined in claim 3 wherein said output is operatively coupled to a host system whereby said host system is enabled to determine if the cartridge is coupled to or uncoupled from said receptacle.

5. Apparatus for coupling operating power into an electronic vault cartridge coupled to a vault receptacle host system comprising:
   a primary of a power transformer having a primary portion of a transformer core and a primary winding coupled to said primary portion of said core, said primary being disposed within a vault cartridge receptacle and having a source of excitation energy operatively coupled to said primary winding; and
   a secondary of said power transformer having a secondary portion of said transformer core and a secondary winding coupled to said secondary portion of said core, said secondary being disposed within an electronic vault cartridge adapted for being coupled to and uncoupled from said cartridge receptacle, and wherein
   said primary and said secondary each have a substantially flat, planar shape such that when said cartridge is coupled to said receptacle corresponding exposed areas of said primary and said secondary portions of said core are physically coupled together such that magnetic flux continuity is established between said primary portion and said secondary portion of said core whereby said excitation energy induces an energy output from said secondary winding for providing power to said vault cartridge.

6. Apparatus as defined in claim 5 further comprising current sense means operatively coupled to said primary winding for sensing a current flow in said primary winding due to said cartridge being coupled to said receptacle.

7. Apparatus as defined in claim 6 wherein said current sense means has an output signal expressive of the coupling state of said cartridge and wherein said output signal is coupled to a host system whereby said host system is enabled to determine the coupling state of said cartridge.

8. Apparatus as defined in claim 5 wherein said primary portion has a substantially U shape having a closed bottom portion and an open upper portion and wherein said secondary portion has a substantially linear shape configured to fit within the upper open portion of said primary portion.

9. Apparatus as defined in claim 5 wherein said host system is coupled to a printing means for printing indicia representative of a monetary value and wherein said electronic vault cartridge comprises data storage means operable for storing data related to the printing of items of value, said data storage means being powered from the output of said secondary winding.

10. Apparatus as defined in claim 8 wherein said vault cartridge has a planar shape defined by two trapezoids having a common base and unequal heights.

11. Apparatus as defined in claim 10 wherein said vault cartridge has inwardly tapering side edge surfaces having a given angle of taper from said base and wherein said secondary portion has tapered opposing end surfaces exposed upon outer side walls of said cartridge.

12. Apparatus as defined in claim 11 wherein said primary portion has opposing tapered surfaces upon said upper open portion adapted for physically engaging said end surfaces of said secondary portion.

13. Apparatus as defined in claim 12 wherein said given angle is approximately 15 degrees.

14. Apparatus as defined in claim 13 wherein said secondary portion has a length of approximately 2.5 inches and a thickness of approximately 0.125 inch.

15. In a value printing system comprising a host system coupled to a printing means for printing indicia representative of a monetary value and a vault cartridge coupled to the host system for storing data related to the value of printed indicia, apparatus for magnetically coupling electrical power into said vault cartridge comprising a primary portion of a power transformer disposed within a vault receptacle, said primary portion having a primary transformer core having a primary winding magnetically coupled thereto and a source of excitation energy operatively coupled to said primary winding for providing primary winding current for inducing a magnetic flux into said primary core, said apparatus further comprising a secondary portion of said power transformer disposed within said cartridge, said secondary portion having a secondary winding magnetically coupled thereto and a power conditioning means operatively coupled to said secondary winding for generating cartridge operating power therefrom, said primary and said secondary portions of said transformer core being disposed relative one to another when said cartridge is inserted within said receptacle said primary and said secondary portions are physically coupled together such that the magnetic flux induced into the primary core flows through the secondary core for inducing an output from the secondary winding.

16. Apparatus as defined in claim 15 further comprising primary winding current sensing means having an output expressive of the presence or absence of primary winding current, said primary winding current being present when said secondary portion of said transformer core is magnetically coupled to said primary portion of said core, the output being operatively coupled to said host system whereby said host system is apprised of the presence or absence of said cartridge within said receptacle.

17. In a value printing system comprising a host system coupled to a printing means for printing indicia representative of a monetary value, the host system further being coupled to a vault cartridge receptacle operable for having inserted within and retaining a vault cartridge, said vault cartridge being operable for storing data related to the printing of indicia, a method for determining a coupling state of the vault cartridge relative to the host system comprising the steps of:

magnetically coupling electrical power into the cartridge by providing a primary portion of a power transformer within the vault receptacle, the primary portion having a primary transformer core having a primary winding magnetically coupled thereto and a source of excitation energy operatively coupled to the primary winding for continuously providing primary winding current thereto for inducing a magnetic flux into the primary core, and further providing a secondary portion of the power transformer within the cartridge the secondary portion having a secondary winding magnetically coupled thereto and a power conditioning means operatively coupled to said secondary winding for generating cartridge operating power therefrom, the primary and the secondary portions of the transformer core being disposed one to another, when the cartridge is inserted within the receptacle, such that the magnetic flux induced into the primary core flows through the secondary core for inducing an output from the secondary winding; and sensing a magnitude of the primary current to determine if magnetic continuity is present between the primary core and the secondary core, the continuity being present when the cartridge is inserted within the receptacle.

* * * * *